Jan. 7, 1958 L. ROSS 2,818,952
LEVER DESIGN FOR SPRING-LOADED CLUTCH
Filed March 21, 1955
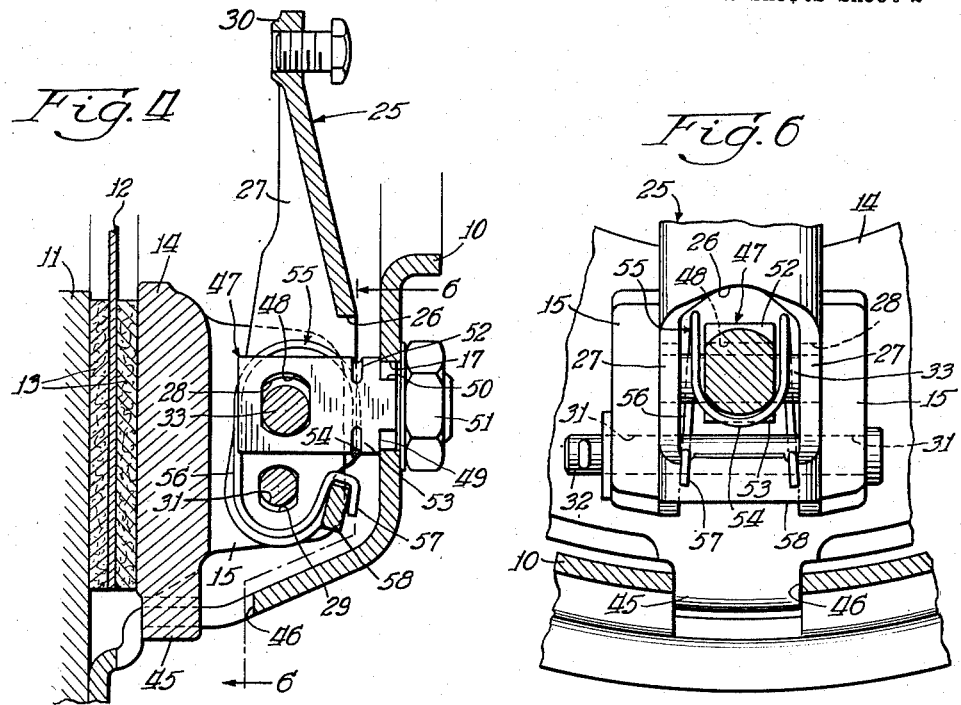
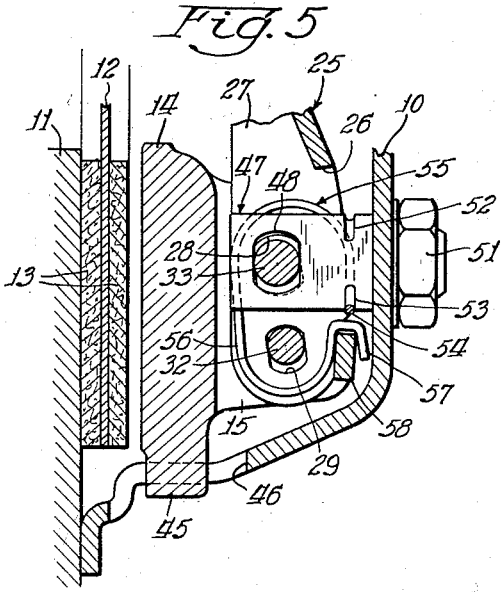
Inventor:
Louis Ross
By: N. J. Schmid
Atty.

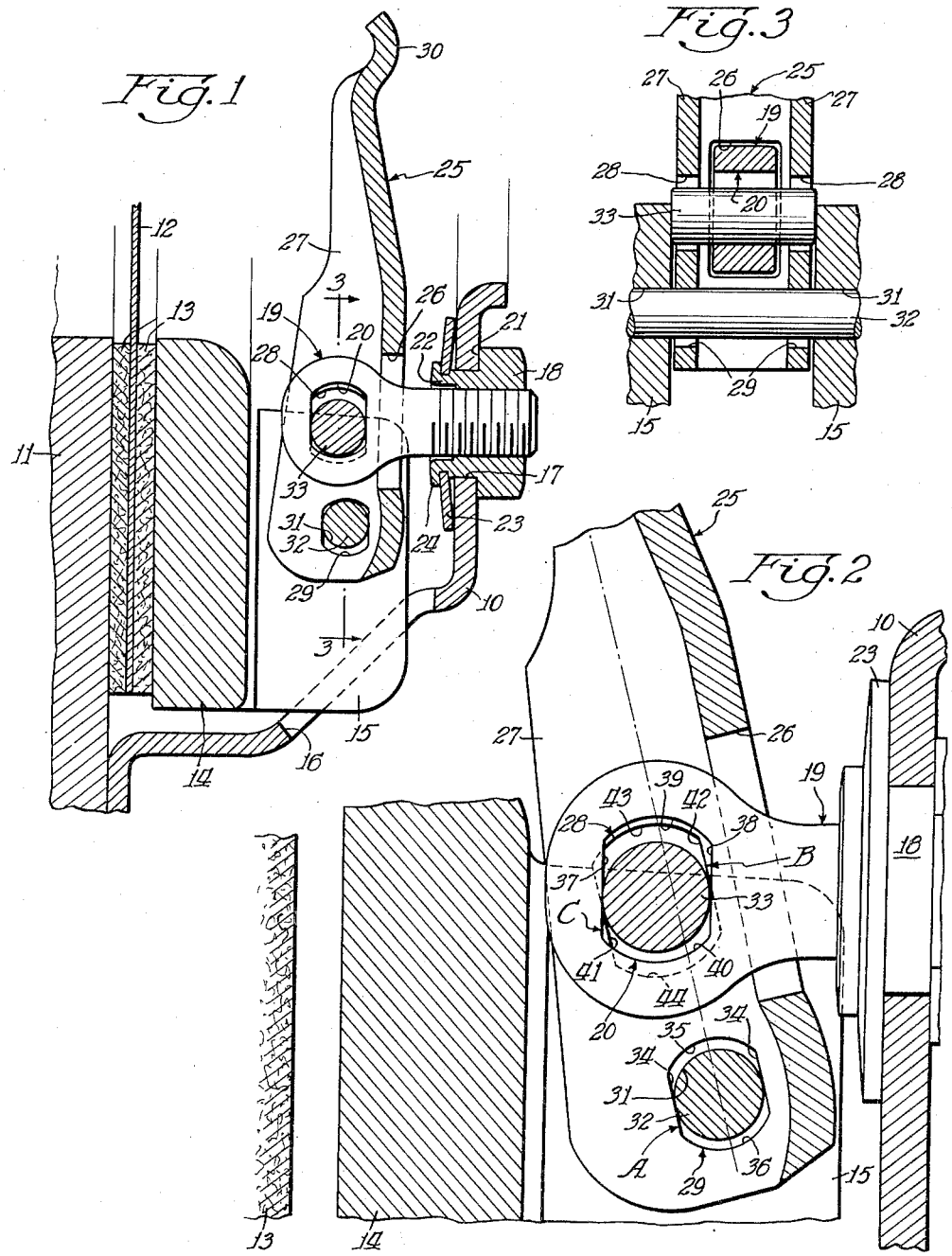

United States Patent Office 2,818,952
Patented Jan. 7, 1958

2,818,952

LEVER DESIGN FOR SPRING-LOADED CLUTCH

Louis Ross, Rockford, Ill., assignor to Borg-Warner Corporation, Chicago, Ill., a corporation of Illinois Application March 21, 1955, Serial No. 495,549

11 Claims. (Cl. 192—99)

This invention relates to friction clutches of the type employed in motor vehicles and has as its general object to provide an improved clutch operating lever system, and to provide anti-frictional means for operating a clutch assembly.

A more specific object of the invention is to provide an improved clutch lever arrangement wherein friction is materially reduced during movement of the lever to and from the clutch operating position, thus insuring a longer and more satisfactory life to the clutch.

Still another object of the invention is to provide a resilient member for a clutch control lever to prevent rattle or backlash, said resilient member being operatively associated with the anti-frictional means for operating the clutch assembly.

These and other objects and features of the invention will become apparent from the following specification when taken together with the accompanying drawings, in which:

Figure 1 is a vertical central view of a portion of one modification of a clutch embodying the lever arrangement of the invention, the clutch being shown in its engaged position, with parts of the clutch being shown in section;

Figure 2 is an enlarged detailed sectional view of the clutch of Figure 1, showing the clutch lever arrangement in released position;

Figure 3 is a sectional view on line 3—3 of Figure 1, looking in the direction of the arrows;

Figure 4 is a vertical central view of a portion of another modification of a clutch embodying the lever arrangement of the invention, the clutch being shown in its engaged position, with parts of the clutch being shown in section;

Figure 5 is an enlarged detailed sectional view of the clutch of Figure 4, showing the clutch lever arrangement in released position; and, Figure 6 is a sectional view on line 6—6 of Figure 4, looking in the direction of the arrows.

In the various views, the same reference characters are employed to refer to the same parts.

The particular clutch operating lever arrangement, according to this invention, for purposes of illustration, may be associated with a spring-loaded clutch of the type shown in Nutt et al. Patent No. 2,062,102, issued November 24, 1936, or a clutch of the type shown in Nutt Patent No. 2,406,244, issued August 20, 1946.

Referring to Figures 1 to 3 of the drawings, there is illustrated a cover plate 10, which may be a metal stamping, suitably connected for rotation with a flywheel 11, which is partially shown in section in Figure 1. The flywheel is rotatably connected to a drive shaft (not shown). Also illustrated is friction disc 12, provided with suitable facings 13, adapted to be packed in frictional engagement with a pressure plate 14 and the flywheel 11, by pressure supplied to the pressure plate by springs or other suitable means (not shown).

The pressure plate has formed thereon pairs of spaced ears or bosses 15 (see Figure 3) for the reception of the means mounting the operating lever arrangement to be described. The spaced ears or bosses 15 pass through openings 16, provided in the cover plate, so as to assist the pressure plate in rotating with the cover plate 10 and flywheel 11. The cover plate 10 is also provided with openings 17 (only one of which is shown), each of which receives a nut 18 connected to an externally-threaded portion of an eye-bolt 19, having an opening 20 therein defined by particular faces, which will be later described. Each of the nuts 18 is formed with a flange 21 for abutment with the outside of the cover plate 10 and a reduced extension 22 which is passed through the opening 17 and over which is placed a Belleville spring type washer 23, which contacts the inside of the cover plate 10. The reduced extension 22 of the nut 18 is swaged as at 24 over the washer to hold the assembly in position. The Belleville washer is so associated with the control lever to prevent rattle or backlash and does not in any way affect the thrust load of the clutch.

There is provided between each pair of ears or bosses 15 on the pressure plate an operating lever 25 adapted for swinging motion, which comprises a sheet metal stamping substantially U-shaped in cross-section. The lever 25 is provided with an opening 26 in the bottom of the U for passage over the eye-bolt, and the side walls 27 are provided with spaced openings 28 and 29, the shape and purpose of which will be later described. One end 30 of the operating lever 25 is adapted to be engaged by any suitable means for engaging and disengaging the clutch.

The spaced ears or bosses 15 are provided with apertures 31 in which is disposed with a sliding fit, a steel pin 32 which also passes through openings 29 in the side walls of the lever 25 positioned between the ears or bosses 15. The pin 32 forms a pivot for the lever 25.

Fitted between the spaced ears or bosses 15 and axially movable therebetween and also passing through the opening 20 in the eye-bolt 19 and the openings 28 in the operating lever 25 and having its ends abutting the bosses 15 is a second pin or roller 33, the purpose of which will be later described.

The openings 29 in operating lever 25 through which pin 32 extends are elongated and are formed with flat, parallel sides or surfaces 34, joined at their ends by an inner arcuate surface 35 and an outer arcuate surface 36. The spacing between the flat sides 34 is slightly greater than the diameter of the pin 32 as is shown in Figure 1, the operating lever 25 resting with the inner arcuate surface 35 against pin 32 due to centrifugal force developed by the rotation of the clutch until commencing release thereof.

As before noted, the eye-bolt has an opening or eye 20 therethrough and through which passes the pin or roller 33. The opening or eye 20 is elongated and has flat, parallel sides or surfaces 37 and 38 joined at their ends by an inner arcuate surface 39 and an outer arcuate surface 40. The spacing between the flat surfaces 37 and 38 is slightly greater than the diameter of the pin or roller 33. As shown in Figure 1, the pin or roller 33 provides a fulcrum for the lever and will rest against the outer arcuate surface 40 due to centrifugal force developed by the rotation of the clutch until commencing release thereof.

The openings 28 in the release lever 25 through which the pin or roller 33 passes are also elongated and have flat, parallel sides or surfaces 41 and 42, joined at their ends by arcuate surfaces 43 and 44. These openings are of a shape similar to the opening or eye of the eye-bolt and the flat sides are spaced a distance slightly greater than the diameter of the pin or roller 33. These openings 28 are more elongated than the opening or eye of the eye-bolt and the arcuate surfaces 41 and 42 are provided for clearance only.

Attention is directed to Figure 2 of the drawing which shows one of the flat surfaces 34 of the opening 29 designated with the letter A and which will be referred to as the lever pressure surface A. The flat surface 42 of lever opening 28 is designated with the letter B and will be referred to as the lever pressure surface B. The flat surface 37 of the eye or opening 20 of the eye-bolt is identified with the letter C and will be referred to as the eye-bolt pressure surface C. The force applied by each during release is in the same direction as the arrow which points to the surface.

The motion of the operating lever 25, at any given instant during the release travel, is rotation about the axis formed by the line of contact of lever pressure surface A and pin 32. As release progresses, this line of contact moves an equal distace over the lever pressure surface A and the surface of the pin 32 thus describing a rolling action between the two. Reliance that this action will work, without skidding, is based on the fact that the potential friction reaction between the lever pressure surface A and the surface of pin 32 is greater than any likely combination of centrifugal force and opposing friction reaction. Assurance that pin or roller 33 will cease contact with outer arcuate surface 40 during release is provided in the positioning of the two lever pressure surfaces relative to each other. Thus, lever pressure surface B has a composite of motion causing pin or roller 33 to roll away from outer surface 40. This permits pin or roller 33 to roll freely with only one line of contact in the lever openings 28 and one line of contact in the eye or opening 20.

Referring now to Figures 4 to 6 of the drawing, there is illustrated a modification of the invention wherein there is shown a cover plate 10, a flywheel 11, a friction disc 12 with facings 13 thereon and a pressure plate 14, all of which are similar to the corresponding elements of the modification shown in Figures 1 to 3. As in the Figures 1 to 3 modification, the flywheel is rotatably connected to a drive shaft (not shown) and the cover plate is connected for conjoint rotation therewith. The disc, plate and flywheel are likewise adapted to be packed in frictional engagement by springs or other suitable means (not shown).

The pressure plate has formed thereon pairs of spaced ears or bosses 15 (see Figure 5) for the reception of means mounting the operating lever arrangement to be described. The pressure plate 14 is provided with spaced lugs 45, each of which passes through an opening 46 in the cover plate, so as to assist the pressure plate in rotating with the cover plate and flywheel. Like the modification shown in Figures 1 to 3, the cover plate is provided with spaced openings 17 (only one of which is shown) and each opening receives a threaded pivot block 47 having an opening 48 therein. The opening 48 is identical in shape with the eye 20 of the eye-bolt 19 shown and described with reference to the Figures 1 to 3 modification. A flanged portion 49 of the pivot block 47 abuts the inside of the cover plate while a reduced portion 50 passes through the opening 17, each block 47 being retained in proper position by means of a nut 51 which abuts the outside of the cover plate.

The pivot block 47 is formed with radially extending shallow grooves 52 and 53, the groove 53 receiving a generally U-shaped portion 54 of a hair pin spring member 55 which has leg portions 56 of generally C shape, the free end of each C being bent at 57 in such a manner to be received over a web portion 58 of the operating lever 25. This spring member is so associated with the control lever as to prevent rattle or a backlash and does not in any way affect the thrust load of the clutch, and replaces functionally the Belleville washer of Figures 1 to 3 modification.

In a similar manner as in the Figures 1 to 3 modification, there is provided between each pair of ears or bosses 15 on the pressure plate an operating lever 25 adapted for swinging movement which comprises a sheet metal stamping substantially U-shaped in cross-section. The lever 25 is provided with an opening 26 in the bottom of the U for passage over the pivot block 47 and the side walls 27 are provided with spaced openings 28 and 29, the openings being identical in shape and position with the corresponding openings shown in the Figures 1 to 3 modification. Also, an end 30 of the lever 25 is adapted to be engaged to any suitable means for engaging and disengaging the clutch.

The spaced ears or bosses 15 are provided with apertures 31 in which is disposed, with a sliding fit, a steel pin 32, which also passes through the openings 29 in the side walls of the lever 25 between the ears or bosses 15. The pin 32 functions in the identical manner as it does in the modification shown and described in the Figures 1 to 3. A second pin or roller 33 passes through the opening 48 in the pivot block 47 and the openings 28 in the lever 25 and has its ends abutting the bosses 15. This pin 33 also functions in the identical manner as the pin 33 shown and described with reference to the Figures 1 to 3 modification.

In the modification just described with reference to Figures 4 to 6, the operation of the operating lever and associated parts are identical to that described with reference to Figures 1 to 3 and reference is made to the description of the operation of the modification shown in Figures 1 to 3.

While I have described this invention is connection with two specific embodiments thereof, it is to be understood that this is by way of illustration and not by way of limitation and the scope of this invention is defined solely by the appended claims which should be construed as broadly as the prior art will permit.

I claim:

1. A clutch comprising a rotatable drive member and a pressure plate adapted to be packed together for conjoint rotation; a radially extending operating lever for shifting said pressure plate axially with respect to said drive member; and anti-friction means supporting said lever, comprising a pin carried by said pressure plate and extending through said lever, said lever having a pin-receiving aperture with opposed flat side walls on which said lever has rocking contact with said pin; a support carried by said drive member and having an opening therein with opposed flat side walls; a fulcrum roller in said opening having rolling contact with the flat side walls thereof; and said lever having a second opening with opposed flat side walls located radially inward from said pin-receiving aperture for receiving said roller for effecting rolling action of said lever on said roller during movement of said lever.

2. A clutch as recited in claim 1, wherein said support comprises an eye-bolt and said first-named opening comprises an eye.

3. A clutch as recited in claim 1, wherein said support comprises a pivot block.

4. A clutch comprising a rotatable drive member and a pressure plate adapted to be packed together for conjoint rotation; a radially extending operating lever for shifting said pressure plate axially with respect to said drive member; and anti-friction means supporting said lever, comprising a pin carried by said pressure plate and extending through said lever, said lever having a pin-receiving aperture with opposed flat parallel side walls on which said lever has rocking contact with said pin; a support carried by said drive member and having an opening therein with opposed flat parallel side walls; a fulcrum roller in said opening having rolling contact with the flat side walls thereof; and said lever having a second opening with opposed flat parallel side walls located radially inward from said pin-receiving aperture for receiving said roller for effecting rolling action of said lever on said roller during movement of said lever.

5. A clutch comprising a rotatable drive member and a pressure plate adapted to be packed together for conjoint rotation; a pair of spaced ears on said pressure plate; a radially-extending operating lever for shifting said pressure plate axially with respect to said drive member, said lever having a central web and longitudinal side walls; and anti-friction means supporting said lever, comprising a pin extending through said lever side walls and received at its opposite ends in said pressure plate ears, said lever having a pin-receiving aperture with opposed flat side surfaces on which said lever has rocking contact with said pin; a support carried by said drive member adjacent said pressure plate ears and having an opening therein with opposed flat side surfaces; a roller in said opening having rolling contact with the flat side surfaces thereof; and said lever having a second aperture with opposed flat side surfaces, which surfaces lie substantially parallel with the flat surfaces of said pin-receiving aperture in said lever, located radially inward from said pin-receiving aperture for receiving said roller; and said lever during its clutch operating movement having rolling movement on said roller.

6. A clutch comprising a rotatable drive member; an axially movable pressure plate spaced from said drive member and rotatable therewith; a driven disc adapted to be packed between said members; and anti-friction means for axially moving said pressure plate comprising a radially-positioned lever of U-shaped cross-section, connected to said drive member and to said pressure plate for swinging movement, said lever connection to said pressure plate comprising a first round pin carried by said pressure plate and being engaged in a lever opening having flat opposed sides on which said lever pivots during the swinging movement thereof; said lever connection to said drive member comprising a second round pin mounted for free rolling movement against flat opposed sides of a drive member opening, and said lever having therein a second opening with flat opposed sides against which said second pin has free rolling movement during the swinging movement of said lever.

7. A clutch comprising spaced first and second drive members; a driven disc adapted to be packed between said members, said second drive member defining an axially movable pressure plate; an elongated radially positioned operating lever having pivotal connections respectively with said pressure plate and said first drive member and adapted for swinging movement; a support carried by said first drive member and having an aperture therein with flat opposed sides, said lever connection with said pressure plate comprising a first round pin carried by said pressure plate and being engaged in an opening in said lever having flat opposed sides upon which said lever rocks during its swinging movement, the lever connection with said first drive member comprising a second round pin mounted for free rolling movement against the flat opposed sides of said support aperture, said lever having therein a second aperture with flat opposed sides against which said second pin has free rolling movement during the swinging movement of said lever.

8. A clutch comprising spaced first and second drive members; a driven disc adapted to be packed between said members, said second drive member defining an axially movable pressure plate; an elongated radially positioned operating lever having pivotal connections respectively with said pressure plate and said first drive member and adapted for swinging movement; a support carried by said first drive member and having an aperture therein with flat opposed sides, said lever connection with said pressure plate comprising a first round pin carried by said pressure plate and being engaged in an opening in said lever having flat opposed sides upon which said lever rocks during its swinging movement, the lever connection with said first drive member comprising a second round pin mounted for free rolling movement against the flat opposed sides of said support aperture, said lever having therein a second aperture disposed radially outward from said first lever opening with flat opposed sides against which said second pin has free rolling movement during the swinging movement of said lever.

9. Anti-frictional means for operating a clutch assembly, which includes a drive member and a pressure plate, comprising a radially-extending lever adapted for swinging movement and supported by said drive member and having first and second flat pressure surfaces, the first pressure surface being disposed radially outward from the second surface and in a plane approximately parallel therewith; a pin carried by said pressure plate with which pin said lever has rocking engagement with the aforesaid first pressure surface; means carried by said drive member including a flat pressure surface adjacent said second lever pressure surface; and a roller means engaged with said adjacent flat pressure surfaces of said lever and said means carried by said drive member for effecting rolling action of said lever on said roller during said swinging movement of said lever on said pin.

10. Anti-frictional means for operating a clutch assembly, which includes a drive member and a pressure plate, comprising a radially-extending lever adapted for swinging movement and supported by said drive member and having apertures therein which include first and second flat pressure surfaces, the first pressure surface being disposed radially outward from the second surface and in a plane approximately parallel therewith; a pin carried by said pressure plate with which pin said lever has rocking engagement with the aforesaid first pressure surface; an eye-bolt carried by said drive member, the eye of which includes a flat pressure surface adjacent said second lever pressure surface; and a roller means engaged with said adjacent flat pressure surfaces of said lever and eye for effecting rolling action of said lever on said roller during said swinging movement of said lever on said pin.

11. Anti-frictional means for operating a clutch assembly, which includes a drive member and a pressure plate, comprising a radially-extending lever adapted for swinging movement and supported by said drive member and having apertures therein which include first and second flat pressure surfaces, the first pressure surface being disposed radially outward from the second surface and in a plane approximately parallel therewith; a pin carried by said pressure plate with which pin said lever has rocking engagement with the aforesaid first pressure surface; a pivot block carried by said drive member having an opening therein which includes a flat pressure surface adjacent said second lever pressure surface; and a roller means engaged with said adjacent flat pressure surfaces of said lever and opening for effecting rolling action of said lever on said roller during said swinging movement of said lever on said pin.

References Cited in the file of this patent

UNITED STATES PATENTS

| 2,029,187 | Pfeiffer | Jan. 28, 1936 |
| 2,061,093 | Tatter | Nov. 17, 1936 |
| 2,453,344 | Root | Nov. 9, 1948 |

FOREIGN PATENTS

| 7,648 | Great Britain | Mar. 31, 1913 |